US009545953B2

(12) United States Patent
Wolff et al.

(10) Patent No.: US 9,545,953 B2
(45) Date of Patent: Jan. 17, 2017

(54) INSTRUMENT PANEL FOR A VEHICLE, VEHICLE COMPRISING THE INSTRUMENT PANEL, AND METHOD FOR PRODUCING THE INSTRUMENT PANEL

(71) Applicant: GM GLOBAL TECHNOLOGY OPERATIONS LLC, Detroit, MI (US)

(72) Inventors: Stefan Wolff, Erzhausen (DE); Joachim Schaefer, Darmstadt (DE); Stephan Walter, Ringheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/546,652

(22) Filed: Nov. 18, 2014

(65) Prior Publication Data

US 2015/0137550 A1 May 21, 2015

(30) Foreign Application Priority Data

Nov. 18, 2013 (DE) ........................ 10 2013 019 388

(51) Int. Cl.
*B62D 25/14* (2006.01)
*B60R 21/045* (2006.01)

(52) U.S. Cl.
CPC ........... *B62D 25/142* (2013.01); *B60R 21/045* (2013.01); *B62D 25/145* (2013.01)

(58) Field of Classification Search
CPC ......... B60K 35/00; B60K 37/00; B60K 37/06; B62D 25/145; B60R 11/04; B60R 21/2165; B60R 13/02; B60R 13/0256; B60R 2013/0287

(Continued)

(56) References Cited

U.S. PATENT DOCUMENTS 3,654,013 A * 4/1972 Willsie .................... B29C 33/02 156/201
5,312,133 A * 5/1994 Pietila .................. B60H 1/0055 180/90

(Continued)

FOREIGN PATENT DOCUMENTS

DE 3806783 A1 9/1989
DE 102004025570 A1 12/2005

(Continued)

OTHER PUBLICATIONS

Intellectual Property Office of Germany, Search Report dated Jul. 29, 2014 for DE 10 2013 019 388.5.

(Continued)

*Primary Examiner* — Kiran B Patel
(74) *Attorney, Agent, or Firm* — Lorenz & Kopf LLP

(57) ABSTRACT

An instrument panel for a vehicle is provided. The instrument panel has a visible side and a rear side. The rear side has at least one free-space portion and at least one fastening portion, and the instrument panel can be fastened in the fastening portion to a vehicle structure of the vehicle. The instrument panel comprises at least one foam body, and the foam body is formed to be elastically deformable. The foam body is arranged between the visible side and the rear side and forms elastically deformable regions on the visible side, and the foam body forms additional elastically deformable regions in the at least one free-space portion on the rear side.

17 Claims, 2 Drawing Sheets

(58) Field of Classification Search
USPC ....... 296/70, 72, 208; 180/90; 280/751, 752; 264/16.4, 16.5, 16.6; 428/71
See application file for complete search history.

(56) References Cited

U.S. PATENT DOCUMENTS 5,333,901 A * 8/1994 Barnes .................. B60R 21/215 180/90
5,364,159 A * 11/1994 Kelman ................. B60K 37/00 180/90
5,394,602 A * 3/1995 Czapp ................... B60R 21/215 156/242
5,569,959 A * 10/1996 Cooper ............... B29C 37/0057 280/728.3
5,620,366 A * 4/1997 Munzel .................. B60H 1/242 454/152
5,762,395 A * 6/1998 Merrifield .......... B60H 1/00028 180/90
5,811,732 A * 9/1998 Beam ....................... H02G 3/00 174/72 A
5,816,609 A * 10/1998 Gray ......................... B32B 7/02 280/728.3
5,863,064 A * 1/1999 Rheinlander ....... B29C 37/0057 280/728.3
6,050,595 A * 4/2000 Knox .................. B60R 21/2165 280/728.3
6,071,591 A 6/2000 Dausch
6,110,037 A 8/2000 Yoshinaka
6,131,945 A * 10/2000 Labrie ................... B60R 21/216 280/728.3
6,203,056 B1 * 3/2001 Labrie ..................... B29C 45/14 280/728.3
6,203,092 B1 * 3/2001 Yoshinaka ........... B62D 25/142 180/90
6,237,933 B1 * 5/2001 Takahashi ........... B60R 21/2165 280/728.3
6,250,678 B1 * 6/2001 Yoshinaka ........... B60H 1/0055 180/90
6,273,495 B1 * 8/2001 Haba .................... B60H 1/0055 180/90
6,440,514 B1 * 8/2002 Ueno ........................ B32B 5/18 280/728.3
6,644,690 B2 * 11/2003 Brownlee ................ B62D 1/16 180/90
6,761,395 B2 * 7/2004 Charbonnel ........ B29C 45/1671 296/208
6,955,376 B1 * 10/2005 Labrie ..................... B29C 45/14 280/728.3
7,128,360 B2 * 10/2006 Scheib ................. B62D 25/142 180/90
7,370,500 B2 * 5/2008 Kapteyn ................ B60K 35/00 248/27.3
7,370,719 B2 * 5/2008 Sakamoto .............. B62D 25/14 180/90
7,735,905 B2 * 6/2010 Mullen ................ B62D 25/145 296/193.02
8,366,182 B2 * 2/2013 Matsutani ............ B62D 25/145 296/187.05
D691,523 S * 10/2013 Waugh ......................... D12/159
8,596,712 B2 * 12/2013 Miller .................... B62D 21/15 296/187.03
8,622,464 B2 * 1/2014 Atsumi ................ B62D 25/145 296/193.02
9,085,096 B2 * 7/2015 Wenzel ................. B29C 45/006
2002/0074776 A1 * 6/2002 Labrie ................... B60R 21/216 280/728.3
2004/0160043 A1 * 8/2004 Litjens .................. B29C 43/021 280/732
2008/0277955 A1 11/2008 Sato
2009/0174216 A1 * 7/2009 Penner ................. B62D 25/145 296/72
2009/0174223 A1 * 7/2009 Penner ................. B62D 25/145 296/193.02

FOREIGN PATENT DOCUMENTS

| | | | |
|---|---|---|---|
| DE | 102008039607 | A1 | 3/2010 |
| EP | 1213191 | A2 | 6/2002 |
| FR | 2729913 | A1 | 8/1996 |
| GB | 2425097 | A | 10/2006 |
| JP | 2003118428 | A | 4/2003 |
| WO | 9513938 | A1 | 5/1995 |

OTHER PUBLICATIONS

Great Britain Patent Office, Great Britain Search Report for Great Britain Application No. 1419781.8, dated May 11, 2015.

* cited by examiner

INSTRUMENT PANEL FOR A VEHICLE, VEHICLE COMPRISING THE INSTRUMENT PANEL, AND METHOD FOR PRODUCING THE INSTRUMENT PANEL

CROSS REFERENCE TO RELATED APPLICATION

This application claims priority to German Patent Application No. 10 2013 019 388.5, filed on Nov. 18, 2013, which is incorporated herein by reference in its entirety.

TECHNICAL FIELD

The technical field relates to an instrument panel for a vehicle and to a vehicle comprising the instrument panel. The technical field also relates to a method for producing the instrument panel.

BACKGROUND

Many vehicles have an instrument panel in which functional components of the vehicle are integrated such as, for example, display and control devices. Usually, the instrument panel also comprises ventilation slots through which cold or warm air is fed into the vehicle. For this purpose, suitable air ducts may be integrated in the instrument panel. Many instrument panels may be made completely from plastic material or they comprise a plastic support that is fastened to the vehicle structure of the vehicle. Instrument panels having foam bodies may be known.

For example, the printed publication EP 1 213 191 B1 describes an instrument panel having at least one contoured support from a plastic material and having a foam body provided on the contoured support. An air duct may be formed in the foam body and/or in the contoured support. The foam body is fastened as a prefabricated part directly on the contoured support.

In addition, other objects, desirable features and characteristics will become apparent from the subsequent summary and detailed description, and the appended claims, taken in conjunction with the accompanying drawings and this background.

SUMMARY

The various teachings of the present disclosure provide a functionally improved instrument panel. In one embodiment, provided is an instrument panel for a vehicle, in one example, for a passenger car or truck. The instrument panel comprises a dashboard of the vehicle and/or forms the same. It has a visible side and a rear side. The visible side is facing towards a vehicle interior of the vehicle and is visible for the passengers of the vehicle when the instrument panel is integrated in the vehicle. The rear side is arranged opposite to the visible side and/or faces away from the latter and is not visible for passengers.

The rear side has at least one free-space portion and at least one fastening portion. In the fastening portion, the instrument panel can be fastened to a vehicle structure of the vehicle. The free-space portion generally remains free from functional areas and/or further components. In one example, the free-space portion has no fastening functions. However, it is possible that the free-space portion contacts components of the vehicle and/or is supported thereon.

The instrument panel comprises at least one foam body that is formed to be elastically deformable. In one example, the foam body is formed to be compressible or dentable. For example, the foam body is designed as a foamed molding that is produced in a molding process in a corresponding tool.

The foam body is arranged between the visible side and the rear side. Generally, the foam body extends at least in certain regions between the visible side and the rear side. In one example, the foam body extends completely between the visible side and the rear side.

On the visible side, the foam body forms elastically deformable regions. In one example, the elastically deformable regions extend over at least about 60 percent, for example, at least about 70 percent and in one example, over at least about 80 percent of the visible side. Further, in one embodiment, the foam body forms the elastically deformable regions over the entire visible side.

The foam body forms elastically deformable regions in the free-space portion on the rear side of the instrument panel. In one example, the foam body forms full-surface regions and continuous elastically deformable regions in the free-space portion. Specifically, the free-space portion is formed, by the foam body, to be about 100 percent elastically deformable.

With the elastically deformable regions formed by the foam body on the visible side, it is possible to reduce danger of injury in an event with the visible side of the instrument panel.

Due to the fact that the foam body is arranged between the visible side and the rear side and forms a portion, generally a large portion, of the instrument panel, the weight thereof can be advantageously reduced. Weight reduction is achieved in that the foam body is formed completely without supports and/or reinforcement, at least on the visible side, in the free-space region on the rear side and the region therebetween. This has the additional advantage that the number of components needed for the instrument panel can be reduced. For example, no bending-resistant plastic support is needed and/or used for the foam body. As a result, costs to produce the instrument panel can be reduced.

In one embodiment of the present disclosure, the free-space portion forms at least about 60%, for example at least about 70%, in one example at least about 80% and/or maximally about 90% of the rear side of the instrument panel.

In one example, the free-space portion can be molded directly and/or exclusively in a molding process and in a tool of the foam body. For example, the free-space portion is molded in the same molding process and in the same tool in which the foam body is foamed. Specifically, the free-space portion is formed exclusively from the at least one foam body. In one example, the free-space portion, for example, the foam body forming the free-space portion, is formed without reinforcement and/or without a support.

In one embodiment of the present disclosure, the instrument panel comprises a fastening device for fastening the instrument panel to the vehicle structure. The fastening device is generally arranged in the fastening portion. As an alternative, the fastening device forms the fastening portion. For example, the fastening device is designed as a bending-resistant plastic part and/or as a metal part, and/or the fastening device comprises a plastic and/or metal part. For example, the fastening device is designed as a clamp, screw or as a pin or hook, etc. Generally, a plug, clip and/or screw connection to the vehicle structure can be implemented by the fastening device.

In one example, the fastening device is firmly bonded to the foam body. For example, the fastening device is embedded in the foam of the foam body. For example, it is enclosed by a basic material of the foam body. This is of advantage if the fastening device is designed as the plastic part and/or comprises the latter since both materials can be bonded to one another in the molding process in a simple, fast and cost-effective manner.

As an alternative or, optionally, in addition, the fastening device is adhesively bonded to the foam body. This may be desirable if the fastening device is designed as the metal part and/or comprises the latter since in this way, both materials can be bonded to one another in a simple and cost-effective manner.

It is possible within the context of the present disclosure that the fastening device is formed exclusively from the foam body. In this case, the fastening portion is formed completely by the foam body. As a result, the fastening portion also has elastically deformable regions and/or is designed without reinforcement and/or without a support.

Generally, the fastening device enables to establish a firmly bonding connection, e.g., an adhesive connection and/or welded connection, between the instrument panel and a vehicle structure of the vehicle if the fastening device is formed by the foam body. For example, the vehicle structure is enclosed by the foam of a basic material of the foam body in order to fasten the instrument panel to the vehicle structure. Alternatively, the instrument panel can be adhesively bonded and/or welded in the fastening portion to the vehicle structure.

In one embodiment of the present disclosure, the foam body forms a supporting main component and/or base body of the instrument panel. For example, the instrument panel is formed by at least about 70 percent, for example, at least about 80 percent and in one example, by at least about 90 percent by the foam body. It is also possible within the context of the present disclosure that the instrument panel is formed completely by the foam body. In this case, the instrument panel is formed completely without reinforcement and/or without a support. In one example, the instrument panel comprises no reinforcing components whatsoever such as, for example, support parts from a bending-resistant material, if it is formed completely from the foam body.

In one embodiment of the various teachings of the present disclosure provide that at least one air duct and/or at least one receptacle for a functional part of the instrument panel are/is integrated in the foam body. The functional component is designed, for example, as a speedometer, loudspeaker, ventilation system and/or air conditioning system and/or as a navigation device, radio set etc.

The air duct and/or the receptacle are molded into the foam body during the molding process in the tool. This has the advantage that a subsequent manufacturing step for incorporating the air duct and/or the receptacle can be omitted. Through this, cost and production time can be saved.

Optionally, the foam body has a coating, at least partially and/or in certain regions. In one example, the visible side comprises the coating and/or is formed by the coating. It is also possible within the context of the present disclosure that the rear side comprises the coating and/or is formed by the coating. For example, the coating is formed as a film coating. For example, the coating is firmly bonded to the foam body and is specifically back-foamed with the basic material of the foam body.

The various teachings of the present disclosure also provide a vehicle comprising the instrument panel according to the previous description. Generally, the vehicle comprises the vehicle structure. For example, the vehicle structure is designed as a cross beam of the vehicle, for example, as a so-called cross car beam.

In one example, the instrument panel is fastened in the fastening portion to the vehicle structure in a positive- and/or nonpositive-locking manner, e.g., via the fastening device that is designed as the plastic and/or metal part. This has the advantage that in the case of damage, the instrument panel can be removed from the vehicle structure and can be repaired or replaced, if necessary.

As an alternative, the instrument panel is firmly bonded to the vehicle structure in the fastening portion that is at least partially formed by the foam body. For example, the vehicle structure is enclosed in the fastening portion by the foam of the basic material of the foam body. As an alternative, the vehicle structure is adhesively bonded in the fastening portion to the foam body.

The various teachings of the present disclosure also provide a method for producing the instrument panel according to the previous description.

As part of the method, the free-space portion is molded during the molding process of the foam body directly and exclusively in the same tool as the foam body.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
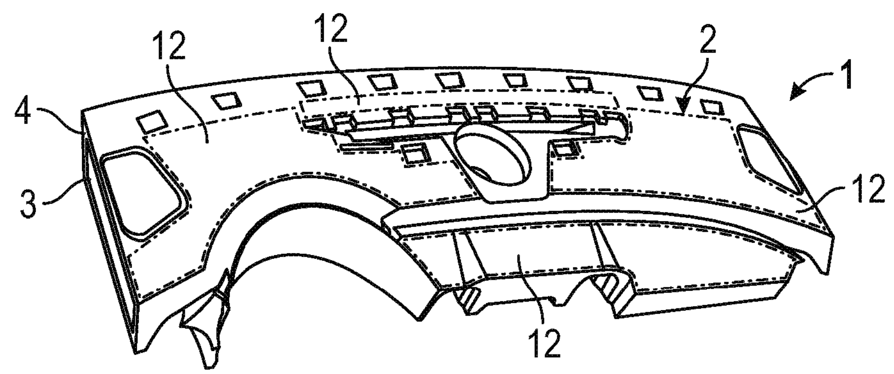
FIG. 1 shows a perspective top view onto a visible side of an instrument panel.

FIG. 1 shows a perspective top view onto the visible side of an instrument panel 1 as an exemplary embodiment of the present disclosure. The instrument panel 1 is designed to be integrated in a vehicle, for example, in a truck or passenger car. In the integrated state in the vehicle, the visible side of the instrument panel 1 faces towards an interior of the vehicle and is visible for passengers in the vehicle.

Figure 3:
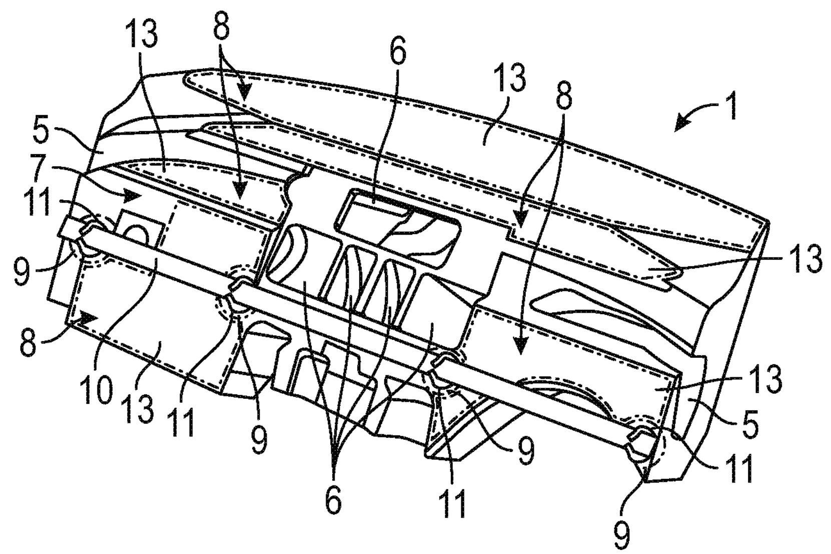
FIG. 3 shows a top view onto a rear side of the instrument panel from FIG. 1.

The instrument panel 1 has a rear side 7 that is shown in FIG. 3. The rear side 7 is arranged opposite the visible side 2. In the integrated state of the instrument panel 1, it faces away from the vehicle interior and is not visible for passengers.

The instrument panel 1 comprises at least one foam body 3 that is elastically deformable. The foam body 3 is produced, in one example, foamed, in a molding process in a tool. The foam body is arranged between the visible side 2 and the rear side 7. The foam body 3 extends completely from the visible side 2 up to the rear side 7. The foam body 3 has a coating 4 on the visible side 2. In one example, the coating 4 forms the visible side 2. The coating 4 is formed as a film coating. It was back-foamed during the molding process by a basic material of the foam body 3.

On the visible side 2, the foam body 3 forms elastically deformable regions 12. Through this, the risk of injury during an event can be reduced.

Figure 2:
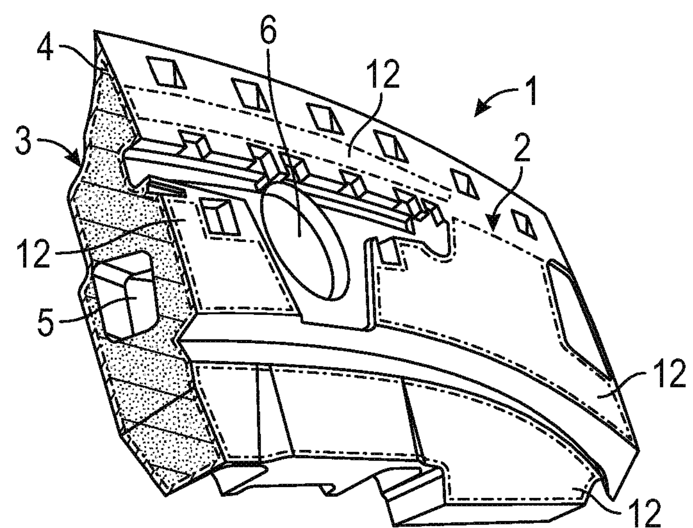
FIG. 2 shows a sectional view of the instrument panel from FIG. 1, in which a section line extends transverse to the longitudinal extent of the instrument panel.

FIG. 2 shows a sectional view of the instrument panel 1 from FIG. 1, wherein a section line extends transverse to a longitudinal extent of the instrument panel. According to the FIGS. 2 and 3, the foam body 3 has at least one air duct 5 and a plurality of receptacles for functional components 6 of the instrument panel 1, e.g., for a loudspeaker and ventilation devices. The air duct 5 and the receptacles 6 have been integrated or molded into the foam body 3 during the molding process thereof. Therefore, a subsequent manufacturing step for incorporating the air duct 5 and/or the receptacles 6 can be dispensed with and costs can be saved.

FIG. 3 shows a top view onto the rear side 7 of the instrument panel 1. It is possible that the rear side 7 comprises the coating 4 of the foam body 3 and/or is formed by the coating.

The rear side 7 has a plurality of free-space portions 8 and a plurality of fastening portions 9. The free-space portions 8 form at least about 60 percent, for example at least about 70 percent and in one example at least about 80 percent and/or maximally about 90 percent of the rear side 7. They are formed exclusively from the foam body 3 and were molded in the molding process of the foam body 3 directly and exclusively by the tool molding the foam body 3. As a result, the foam body 3 forms additional elastically deformable regions 13 in the free-space portions 8 on the rear side 7 of the instrument panel 1. The free-space portions 8 are formed completely without reinforcement and without a support.

The foam body 3 extends at least from the elastically deformable regions 12 on the visible side up to the additional elastically deformable regions 13 on the rear side 7 of the instrument panel 1, in the free-space portions 8. In these portions of extent, the foam body 3 is formed without a support and without reinforcement. In one example, the foam body is formed as a supporting main component and/or main body of the instrument panel 1, at least in the portions of extent.

In the fastening portions 9, the instrument panel 1 is fastened to a vehicle structure 10 of the vehicle. The vehicle structure 10 is designed as a cross beam, for example, as a so-called cross car beam. The cross beam extends on the rear side 7 along the longitudinal extent of the instrument panel 1.

For fastening to the vehicle structure 10, the instrument panel 1 comprises a plurality of fastening devices 11. According to the exemplary embodiment of FIG. 3, the fastening devices 11 are designed as metal and/or plastic clamps that engage around the vehicle structure 10, for example, the cross beam, and thus fasten the instrument panel 1 thereto in a positive- or nonpositive-locking manner.

The fastening devices 11 are arranged in the fastening portions 9 and/or form them. They are firmly bonded there to the foam body 3. If the fastening devices 11 are designed as plastic parts or comprise them, they are embedded in the foam of the foam body 3 or are enclosed by the foam of a basic material of the foam body 3 since both materials can be easily bonded together in the molding process. In contrast, if the fastening devices 11 are designed as a metal part, it is advantageous to adhesively bond them to the foam body 3 so that a secure and durable connection can be ensured.

In an exemplary embodiment, the fastening devices 11 are formed by the basic material of the foam body 3 itself. Here, the vehicle structure 10, for example, the cross beam, is enclosed by the foam of the basic material of the foam body 3 so that the instrument panel 1 is firmly bonded in the fastening portions 9 to the vehicle structure 10. As an alternative, the instrument panel 1 cam also be adhesively bonded and/or welded in the fastening portions 9 to the vehicle structure 10.

In this exemplary embodiment, the fastening portions 9 are also formed completely by the foam body 3. The latter thus likewise forms the elastically deformable regions 13 in the fastening portions 9. In particular, the fastening portions 9 in this exemplary embodiment have no reinforcements and/or support structures. In summary, it can be stated that the instrument panel 1 in this exemplary embodiment is formed completely from the foam body 3. Here, the foam body 3 has no additional reinforcements, inserts or supports whatsoever.

Figure 4:
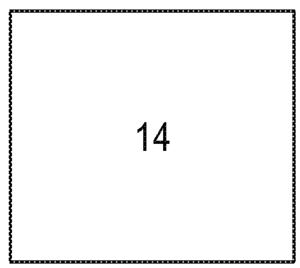
FIG. 4 shows a schematic illustration of a method for producing the instrument panel from FIG. 1.

FIG. 4 shows a schematic illustration of a method 14 for producing the instrument panel 1. The method 14 provides that the free-space portions 8 are molded during the molding process of the foam body 3 directly and exclusively in the same tool as the foam body 3.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An instrument panel for a vehicle, comprising:
- a visible side;
- a rear side having at least one free-space portion and at least one fastening portion, the instrument panel fastenable to a vehicle structure of the vehicle via the at least one fastening portion; and
- a foam body formed to be elastically deformable, the foam body arranged between the visible side and the rear side and having at least one of an air duct or a receptacle integrally formed therein, and the foam body forms elastically deformable regions on the visible side,
- wherein the foam body forms additional elastically deformable regions in the at least one free-space portion on the rear side.

2. The instrument panel according to claim 1, wherein the at least one free-space portion forms at least 60 percent of the rear side.

3. The instrument panel according to claim 1, wherein the at least one free-space portion forms at least 70 percent of the rear side.

4. The instrument panel according to claim 1, wherein the at least one free-space portion forms at least 90 percent of the rear side.

5. The instrument panel according to claim 1, wherein the at least one free-space portion is molded directly and exclusively in a molding process of the foam body.

6. The instrument panel according to claim 1, wherein the at least one free-space portion is formed exclusively from the at least one foam body.

7. The instrument panel according to claim 1, wherein the at least one free-space portion is formed without at least one of a reinforcement and a support.

8. The instrument panel according to claim 1, wherein the instrument panel comprises at least one fastening device for fastening the instrument panel to the vehicle structure, and the at least one fastening device is arranged in the at least one fastening portion.

9. The instrument panel according to claim 1, wherein the instrument panel comprises at least one fastening device for fastening the instrument panel to the vehicle structure, and the at least one fastening device forms the at least one fastening portion.

10. The instrument panel according to claim 8, wherein the at least one fastening device is at least one of a plastic part and a metal part.

11. The instrument panel according to claim 10, wherein the at least one fastening device is firmly bonded to the foam body.

12. The instrument panel according to claim 1, wherein the foam body forms a supporting main component of the instrument panel.

13. The instrument panel according to claim 1, wherein the foam body comprises a coating.

14. A vehicle, comprising:

a vehicle structure;

an instrument panel including:

a visible side;

a rear side having at least one free-space portion and at least one fastening portion, the instrument panel fastenable to the vehicle structure via the at least one fastening portion; and a foam body formed to be elastically deformable, the foam body arranged between the visible side and the rear side and having at least one of an air duct or a receptable integrally formed therein, and the foam body forms elastically deformable regions on the visible side, wherein the foam body forms additional elastically deformable regions in the at least one free-space portion on the rear side.

15. The vehicle according to claim 14, wherein in the at least one fastening portion; the vehicle structure is enclosed by the foam body in order to fasten the instrument panel to the vehicle structure.

16. The vehicle according to claim 14, wherein the vehicle structure is a cross beam of the vehicle.

17. The vehicle according to claim 14, wherein the foam body comprises a coating.

* * * * *